US012764162B2

(12) United States Patent
Jenkins et al.

(10) Patent No.: US 12,764,162 B2
(45) Date of Patent: Oct. 13, 2026

(54) ESTABLISHING ENDPOINT AGENT DEVICE BINDING FOR CLOUD SERVICE COMMUNICATIONS

(71) Applicant: Beyond Identity Inc., West Palm Beach, FL (US)

(72) Inventors: George Maurice Jenkins, West Palm Beach, FL (US); Gregory L. Galloway, West Palm Beach, FL (US)

( * ) Notice: Subject to any disclaimer, the term of this patent is extended or adjusted under 35 U.S.C. 154(b) by 225 days.

(21) Appl. No.: 18/397,936

(22) Filed: Dec. 27, 2023

(65) Prior Publication Data

US 2025/0220044 A1 Jul. 3, 2025

(51) Int. Cl.
*H04L 9/40* (2022.01)

(52) U.S. Cl.
CPC ........ *H04L 63/166* (2013.01); *H04L 63/0435* (2013.01); *H04L 63/0876* (2013.01); *H04L 63/30* (2013.01)

(58) Field of Classification Search
CPC .................................................... H04L 63/166
See application file for complete search history.

(56) References Cited

U.S. PATENT DOCUMENTS

| | | | |
|---|---|---|---|
| 8,898,799 | B2 | 11/2014 | Johnson |
| 10,454,899 | B1 | 10/2019 | Gabrielson |
| 10,728,044 | B1 | 7/2020 | Melo |
| 10,756,908 | B1 | 8/2020 | Melo |
| 10,855,674 | B1 | 12/2020 | Geusz |
| 10,878,468 | B2 | 12/2020 | Sasa |
| 10,972,450 | B1 | 4/2021 | Rao |
| 11,018,869 | B2 | 5/2021 | Sundaresan |
| 11,119,985 | B1 | 9/2021 | Alagianambi |
| 11,336,516 | B1 | 5/2022 | Birgiolas |
| 11,503,056 | B1 | 11/2022 | Celiesius |

(Continued)

FOREIGN PATENT DOCUMENTS

| | | | | | |
|---|---|---|---|---|---|
| CN | 101242336 | A | * | 8/2008 | |
| CN | 117714316 | A | * | 3/2024 | .......... H04L 61/4511 |
| CN | 118400170 | B | | 7/2024 | |

OTHER PUBLICATIONS

FIDO Alliance, How FIDO Addresses a Full Range of Use Cases, Mar. 2022, 9 pages.

(Continued)

*Primary Examiner* — Simon P Kanaan
(74) *Attorney, Agent, or Firm* — Greenberg Traurig, LLP

(57) ABSTRACT

A method for providing a communications channel between a cloud service and a device is provided. A user agent of the device transmits to a coordinator service, a signal to initiate a connection between the user agent and a cloud service. The user agent establishes a connection with the coordinator service. The user agent receives, from the coordinator service, an indication of a unique subdomain of a domain hosted by a gateway service. The user agent transmits, to the gateway service, a handshake message including the subdomain. An authenticator of the device detects the handshake message including the subdomain and sends to the coordinator service, an indication that the handshake message including the subdomain was detected at the device. The user agent receives, from the gateway service, a handshake message to establish a connection with the gateway service.

18 Claims, 9 Drawing Sheets

(56) References Cited

U.S. PATENT DOCUMENTS

| | | | | |
|---|---|---|---|---|
| 12,184,787 | B2 | 12/2024 | Dasen | |
| 2002/0073151 | A1 | 6/2002 | Rogers | |
| 2005/0050324 | A1 | 3/2005 | Corbett | |
| 2008/0046984 | A1 | 2/2008 | Bohmer | |
| 2009/0287935 | A1 | 11/2009 | Aull | |
| 2010/0049683 | A1 | 2/2010 | Carter | |
| 2013/0047247 | A1 | 2/2013 | Matsuda | |
| 2014/0337614 | A1* | 11/2014 | Kelson | H04L 63/166 713/152 |
| 2014/0359481 | A1 | 12/2014 | Dawson | |
| 2015/0012743 | A1* | 1/2015 | Holtmanns | H04L 63/0876 713/155 |
| 2016/0087957 | A1 | 3/2016 | Shah | |
| 2016/0119315 | A1 | 4/2016 | Uzelac | |
| 2016/0366708 | A1 | 12/2016 | Yeom | |
| 2017/0012953 | A1 | 1/2017 | Ylonen | |
| 2017/0193448 | A1 | 7/2017 | Piyush | |
| 2017/0262294 | A1 | 9/2017 | Yakan | |
| 2017/0264559 | A1 | 9/2017 | Lu | |
| 2018/0007119 | A1 | 1/2018 | Das | |
| 2018/0123898 | A1 | 5/2018 | Yakuwa | |
| 2019/0108239 | A1 | 4/2019 | Yang | |
| 2019/0207926 | A1 | 7/2019 | Kaladgi | |
| 2020/0136836 | A1 | 4/2020 | Schiattarella | |
| 2020/0226241 | A1 | 7/2020 | Horst | |
| 2020/0366704 | A1 | 11/2020 | Vasudevan | |
| 2021/0273914 | A1* | 9/2021 | Cobb | H04L 63/0435 |
| 2021/0286758 | A1 | 9/2021 | Verma | |
| 2021/0367795 | A1 | 11/2021 | Brown | |
| 2021/0385215 | A1 | 12/2021 | Summers | |
| 2022/0095108 | A1 | 3/2022 | Siedow | |
| 2023/0110135 | A1 | 4/2023 | Singh | |
| 2023/0344921 | A1* | 10/2023 | Duraisamy | H04L 63/0272 |
| 2023/0351034 | A1 | 11/2023 | Parikh | |
| 2024/0089301 | A1* | 3/2024 | Amro | H04L 63/067 |
| 2025/0260677 | A1* | 8/2025 | Yin | H04L 63/0464 |

OTHER PUBLICATIONS

Grassi, Paul A., Michael E. Garcia, and James L. Fenton. “Digital Identity Guidelines” NIST special publication 800 (2017): 63-3, 52 pages.

Liscano, Ramiro, et al. “Discovering and managing access to private services in collaborative sessions.” IEEE Transactions on Systems, Man, and Cybernetics—Part A: Systems and Humans 36.6 (2006): 1086-1097.

Lodderstedt, et al., “OpenID Connect for Identity Assurance” Mar. 13, 2019, 15 pages.

Madani, Mohamed Amine, and Abdelmounaim Kerkri. “Access Control for Collaboration in Cloud Environment: A Comparative Analysis.” 2023 10th International Conference on Wireless Networks and Mobile Communications (WINCOM). IEEE, 2023, 7 pages.

Paolini et al., “Authentication, Authorization, and Accounting”, 2020, Infrastructures for Environmental and Earth Sciences, LNCS 12003, pp. 247-271. (Year: 2020).

Trusted Computing Group (TCG), Trusted Platform Module Library Part 1: Architecture, Family 2.0, Level 00 Revision 01.59, Nov. 8, 2019, 306 pages.

* cited by examiner

PERFORMANCE - RESULTS

| Test Threads | Num of reqs | Avg (ms) | 90% (ms) | 95% (ms) | 99% (ms) | Max (ms) | Reqs per sec |
|---|---|---|---|---|---|---|---|
| 1 | 8759 | 34 | 35 | 50 | 79 | 1037 | 29.2 |
| 3 | 21945 | 40 | 61 | 72 | 99 | 726 | 73.1 |
| 5 | 29712 | 50 | 75 | 86 | 114 | 1048 | 99.0 |
| 10 | 43027 | 69 | 99 | 112 | 148 | 1128 | 143.4 |
| 25 | 59072 | 126 | 171 | 192 | 255 | 1258 | 196.8 |
| 50 | 61732 | 242 | 311 | 338 | 414 | 1400 | 205.6 |

FIG. 6A

ESTABLISHING ENDPOINT AGENT DEVICE BINDING FOR CLOUD SERVICE COMMUNICATIONS

BACKGROUND OF THE INVENTION

The present invention relates to phishing resistant communications when using a rendezvous channel.

Passwordless solutions offer to increase user security by replacing traditional knowledge-based factors (i.e., the password) with asymmetric cryptography, optionally and desirably protected by a hardware device such as a Trusted Execution Environment (TEE). This is effective in abating concerns related to the systemic issues that plague knowledge-based factors, such as password sharing and re-use, weak or iterative passwords, and the ability to phish the value of the credential itself.

Various types of passwordless solutions exist, including those embedded in commodity web browsers (WebAuthN), operating system mechanisms (Microsoft Hello for Business), those that rely on a second device, and platform authenticators, which focus on authenticating a user via a specific device. Platform authenticators produced by independent software vendors may also execute security posture assessments at the time of authentication and determine access based on assessment results. This paper focuses specifically on challenges faced by third-party platform authenticators that interface with user agents for user login to web services.

Communication and invocation methods used by third-party platform authenticators vary. Invocation methods are used to send signing requests from a user agent to an authenticator, invoking the authenticator to process a request, typically by signing a challenge with a private key. Communication channels must exist between the user agent and the authenticator (typically relayed by a web service) to return credential grants back to the user agent. Authentication grants may take the form of cookies, authentication tokens such as JSON web tokens, or redirect URLs in the case of OAuth, and are highly dependent on the implementation of the passwordless system at play.

Individual implementations of third-party platform authenticators may or may not prevent phishing attacks based on the mechanism used to relay information between the requesting user agent and the authenticator. The mechanism used to deliver a request to the authenticator must provide trustworthy origin information to prevent malicious invocation. In cases where trustworthy origin information cannot be established, bi-directional communication is also typically not possible, leading to the need to relay sensitive information to the user agent in an insecure manner. In practice, this may take the form of a rendezvous channel; a URL uniquely associated with a login attempt that passes credential grants from a web service to a user agent. This makes the implementation phishable as the channel used to pass the credential grant is not guaranteed to be bound to the platform that processed the login, allowing a malicious actor to open a transaction, trick a victim into signing the challenge, and have the malicious actor receive the resulting auth grant. If the invocation and communication mechanisms offer protection against traditional phishing vectors, they typically do not have wide support for all user agents. This is especially problematic with embedded webviews in third party software. This may lead to situations in which a weaker authentication mechanism must be provided to authenticate with the incompatible application.

Several existing mechanisms exist that may be used by third-party platform authenticators to manage invocation and communication. These mechanisms are explored here with references to existing commercial solutions that use them.

Non-Phish Resistant Mechanisms

There are various products that support non-phish resistant passwordless authentication as a primary mechanism. Push notifications have been widely used due to their simple user experience for end user mobile devices, such as with PingFederate's PingID mobile authenticator.

Okta Fastpass, a commercial passwordless solution, provides multiple non phish resistant mechanisms, such as custom application scheme URLs (MacOS, Windows), App Links (Android), and Universal URLs (iOS). These mechanisms are relied upon when the user agent authenticating does not provide support for loopback-bound communication, such as when legacy applications are in use, or when browsers or firewalls prevent loopback traffic. These fallbacks are inherently insecure due to the lack of origin information. Bidirectional communication between the platform authenticator and the authenticating user agent is also not possible under these schemes, leading to the necessity to pass authentication grants over a rendezvous channel.

Loopback

Okta Fastpass also implements phish resistance by relying on the Origin header and communication to a webserver on the client device accessed over loopback. In a well-formed user agent such as Google Chrome, Mozilla Firefox, or Apple Safari, the Origin header is expected to follow the requirements outlined in RFC 6454—ensuring that the Origin header is present and accurately reflects the domain of origin of the web request. When coupled with Transport Layer Security (TLS) and the wider Certificate Authority (CA) infrastructure, the origin header is deemed sufficient to provide trust in the legitimacy of the request as only the legitimate owner of the domain should have the ability to provide a valid TLS certificate for the domain, preventing traditional adversary-in-the-middle attacks where the adversary provides a fake version of the legitimate site in an attempt to trick the victim into providing their credentials. If the origin of the request fails to match the expected value, or an invalid or self-signed TLS certificate is used, the platform authenticator will detect it and refuse to act on the request. Loopback can also be used for bidirectional communication, avoiding the need for a rendezvous channel as authentication grants can instead be passed directly to the user agent from the authenticator.

WebAuthN/CTAP/FIDO2

FIDO, or Fast Identity Online, also uses the origin concept to provide phish resistance and relies on TLS and CA infrastructure for authentication of domain ownership. FIDO itself is an authentication standard comprised of two different and distinct protocols: the Client to Authenticator Protocol (CTAP) and the Web Authentication (WebAuthn) API. To use FIDO2, an implementation of both CTAP and WebAuthn must be available and interoperable. Although FIDO is becoming widely supported in modern browsers, there remains issues for enterprise deployments as although the protocol supports it, popular browsers do not yet widely support user verifying platform authenticators, preventing software based third party authenticators from integrating with the protocol. Furthermore, as FIDO is an emerging standard, backwards compatibility is not addressed, leaving legacy user agents unsupported.

Mutual TLS (mTLS)

Mutual TLS with client certificates has also been used to provide passwordless authentication, such as in Cloudflare's Zero Trust product. Client certificates are certificates issued to devices for mutual authentication between a server and a client, as both present their certificate during the connection process. Mutual TLS presents challenges with certificate distribution and management and requires mutual TLS support from the user agent to operate, which is typically problematic regarding compatibility with webviews and embedded browsers. Furthermore, operating systems such as Microsoft Windows also presents issues regarding security guarantees of mTLS certificates stored on the host computer.

OS Specific Mechanisms

The operating system may also natively support a mechanism for phish-resistant communication during authentication. Typically, these mechanisms work only in specific scenarios and only with compatible first-party software. One such example is SSO Extensions on Apple devices running MacOS as used by Okta Fastpass, which also requires the use of the Safari web browser. This prevents the mechanism from being used by third-party browsers, and limits efficacy of the solution in holistic deployment scenarios.

Vulnerability Descriptions

Passwordless systems are not without vulnerabilities. In several of the cases presented, the authentication system relies on a rendezvous channel. This term describes a communication channel used to pass messages such as authentication grants from a web service to a user agent-typically taking the form of a URL or a payload that features a unique, unpredictable component bound to a specific authentication attempt. Rendezvous channels are relied upon in the context of platform authenticators when there is no way to pass information directly between the authenticator and the user agent. Instead, the authenticator and the user agent both communicate to a web service that acts as the intermediary. The user agent polls the rendezvous channel during authentication, waiting for the web service to have information regarding status of the attempt.

FIG. 1 is a diagram illustrating a typical prior art rendezvous channel. A user device 102 desires to communicate with a cloud service 104 over the Internet 106. A rendezvous channel is established by the cloud service 104 as a bridge between the platform authenticator 110 and the user agent 108. In step (1), authentication begins by receiving the rendezvous channel URL/handle and polling for the grant of access. In step (2), cloud service 104 requests launching of the authenticator, which is launched through the user agent as the conduit to the device. In step (3), the authenticator returns a proof-of-possession response to the server. Finally, in step (4), an authentication grant is sent over a rendezvous channel.

Rendezvous channels work through security by obscurity-knowing the unique component is enough to access it. Reliance on this property is not enough to provide authentication grant disclosure resistance when the mechanism used to invoke the platform authenticator is not phish resistant. This is because a malicious actor may open an authentication attempt with the web service (gaining access to the rendezvous channel) and phish the user into authenticating against it. If the user completes the authentication using this legitimate but maliciously delivered request, the authentication grant will be delivered to the malicious actor over the rendezvous channel, disclosing sensitive information to an unauthorized party.

In cases where a non-phishing resistant invocation mechanism is used, the platform authenticator enters into a "signing fool" scenario (a scenario where the signer is foolish and signs any request presented to it. It doesn't intelligently limit the requester to only authorized parties on trusted channels.). As there is no origin information that can be used to establish that a request came from a legitimate source over a trusted channel, the authenticator cannot establish that the request is legitimate, and instead may foolishly sign a malicious request.

FIG. 2 is a diagram illustrating a phishing attack on a prior art rendezvous channel. FIG. 2 illustrates a malicious actor abusing a non-phish resistant mechanism to phish a user through information disclosure over the rendezvous channel used to pass authentication grants from the server to the requesting user agent. An attacker 112 with an attacker device 114 uses an attacker user agent 116 to begin authentication, instead of the user device agent 108. In step (2), the authentication request from the user agent is scraped. When the attacker opens the authentication attempt, it needs to be legitimate. They also need to be able to collect the rendezvous channel information from the legitimate request attempt. They do it on their machine (116), so they have full control over the authentication attempt. The challenge is how they prompt the user is platform authenticator (110) to sign the request. The user's platform authenticator (110) can't detect that the request is coming from the attacker's browser (116), not their own (108) and foolishly signs it. Scraping is needed because the attacker needs to get the request out of the page somehow. In general, it's a signed blob of information that the user doesn't see, but it is present within the page and the network history. The attacker could also use other means to collect information out of a webpage. In step (3), the victim is phished to launch their authenticator, which returns a proof of possession in step (4). The cloud service then sends the authentication grant over the rendezvous channel to the attacker user agent 116.

Thus, it would be desirable to establish a rendezvous channel in a manner not vulnerable to two devices both being parties to the same authentication, with an attacker device receiving a grant produced by a different machine.

Unless otherwise indicated herein, the materials described in this section are not admitted to be prior art by inclusion in this section.

BRIEF SUMMARY OF THE INVENTION

In embodiments, a method for providing a communications channel between a cloud service and a device is provided. A user agent of the device transmits, to a coordinator service, a signal to initiate a connection between the user agent and a cloud service. The user agent establishes a connection with the coordinator service. The user agent receives, from the coordinator service, an indication of a unique subdomain of a domain hosted by a gateway service. The user agent transmits, to the gateway service, a handshake message including the subdomain. An authenticator of the device detects the handshake message including the subdomain and sends, to the coordinator service, an indication that the handshake message including the subdomain was detected. The user agent receives, from the gateway service, a handshake message to establish a connection with the gateway service.

In embodiments, a method for providing a device-bound communications channel between a cloud service and a client device is provided. A user agent on the client device sends, to a coordinator service, a request for connection to the cloud service. An authenticator on the client device uses a packet capture module to detect traffic between the user agent and the coordinator service. A transport layer security (TLS) tunnel is established between the user agent and the coordinator service. A redirect is received, from the coordinator service, to a unique rendezvous subdomain hosted by a gateway service. The user agent contacts the gateway service with a TLS client hello message including the unique subdomain. The authenticator detects, using the packet capture module, the TLS client hello message including the subdomain. The authenticator signals to the gateway that it was the device that opened the connection. The user agent receives, from the gateway service, a TLS server hello and unique channel information (a second TLS tunnel) for a rendezvous channel with the cloud service. The authenticator confirms via observation of the second TLS tunnel establishment that it received the full connection, and proceeds with communication over the established channel (a rendezvous channel).

In embodiments, the packet capture by the authenticator obtains a server name indication (SNI) extension in the handshake message between the user agent and the coordinator. The authenticator bundles the SNI extension with a time stamp, signs the bundle with a client device private key, and reports it to the coordinator via an API call.

In embodiments, the redirect from the coordinator service comprises the unique subdomain embedded in a URL received by the user agent as an HTTP redirect (which is enforced to be unique by the server).

BRIEF DESCRIPTION OF THE DRAWINGS

FIGS. 6A-C are performance tables and graphs illustrating experimental results of an authenticator protocol, according to embodiments.

DETAILED DESCRIPTION OF THE INVENTION

Figure 1:
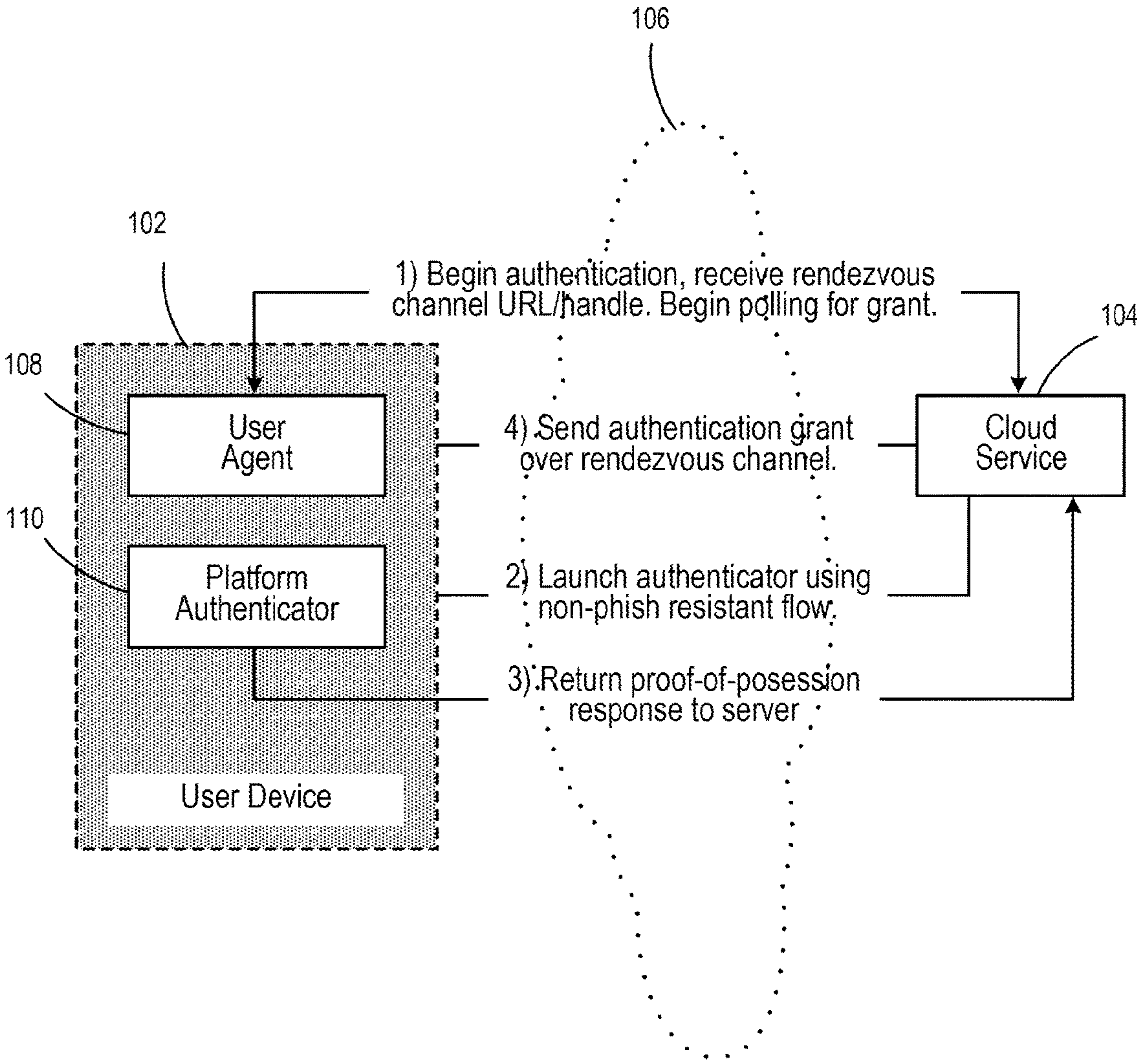
FIG. 1 Prior Art
FIG. 1 is a diagram illustrating a typical prior art rendezvous channel.
Figure 2:
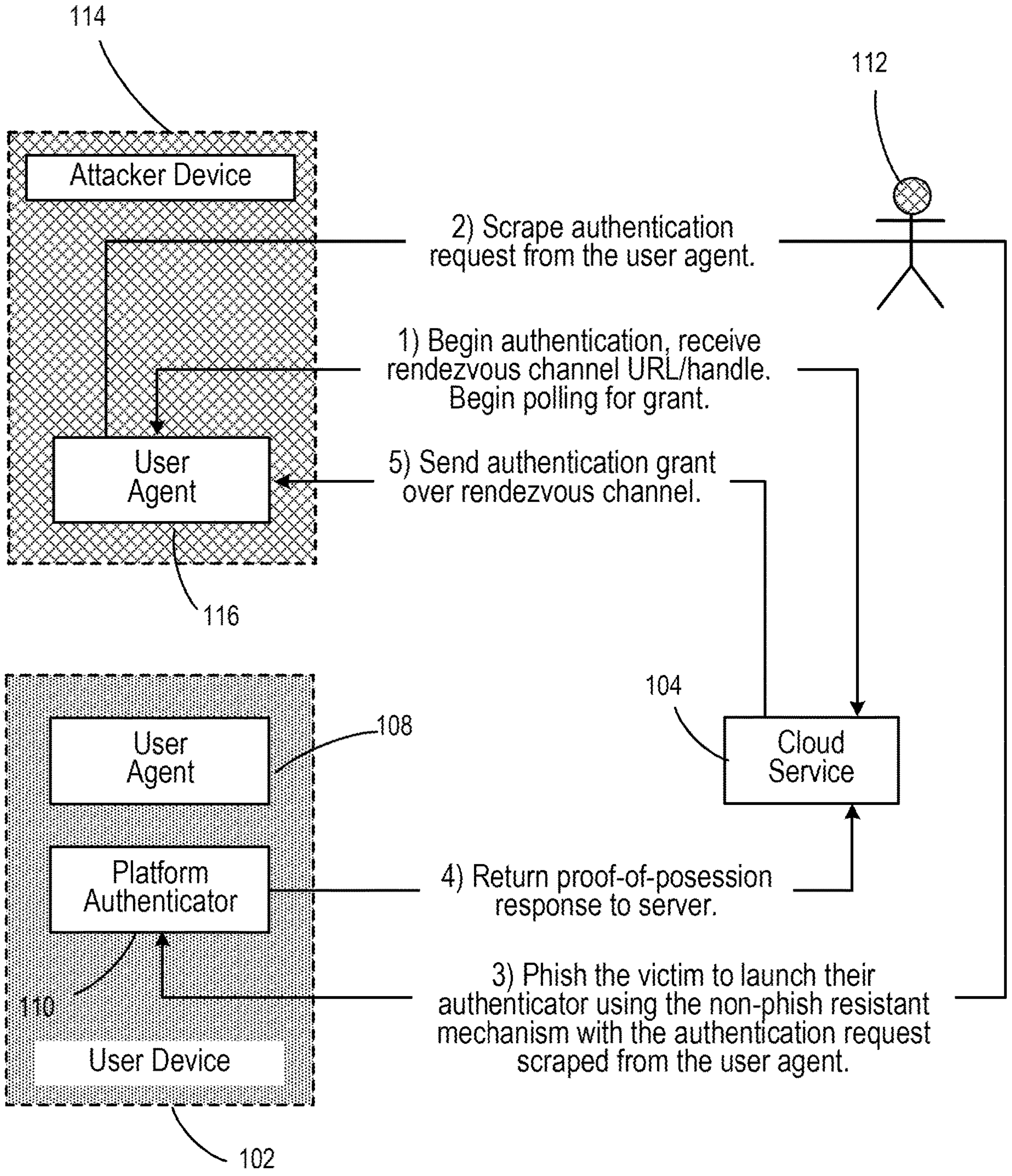
FIG. 2 Prior Art
FIG. 2 is a diagram illustrating a phishing attack on a prior art rendezvous channel.

Aspects of the present disclosure relate generally to phishing resistant communications when using a rendezvous channel for passwordless communications between a user device and a web server, according to certain embodiments.

In the following description, various examples of communication protocols are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high-level summary is intended to provide a basic understanding of some of the novel innovations depicted in the figures and presented in the corresponding descriptions provided below. Aspects of the invention relate to providing a platform authenticator (310 in FIGS. 3, 4) on a user device to replace other authenticators. Instead of implementing a communication channel between the authenticator and a user agent (located on the same client device), the authenticator uses packet capture to receive user agent communications. A packet capture module (316) also captures login traffic between the user device and a web service, which includes the capture and validation of origin information (e.g., Server Name Indication (SNI) extension). The user agent (308) on the user device interacts with a coordinator (312) and gateway (314) on a remote server(s) to set up a rendezvous channel for binding the user device to the web service with a unique channel (TLS session). The rendezvous channel is set up using the captured origin information which is separately provided by the authenticator.

In embodiments, the user agent initiates a TLS handshake with the coordinator via a network request and a TLS tunnel is established between the two. The coordinator generates a unique subdomain (aka "connection nonce") embedded in a URL and sends it to the user agent as an HTTP redirect. There is a redirect to a new subdomain, and a new TLS handshake is established. The SNI value is unencrypted, providing an opportunity for the authenticator to gain needed crucial information. The authenticator then follows the redirect by contacting the gateway using the unique subdomain/connection nonce. The authenticator detects a TLS handshake (ClientHello) with the outbound SNI via packet capture. The authenticator confirms to the coordinator that this outbound connection has been made. This is done over the API (also network call, but explicitly on a defined API endpoint for this particular operation). A TLS tunnel is then established between the user agent and the gateway. Once this channel is established, the user agent is able to communicate with the gateway. The channel is now bound to the current device, so it can't be opened by an adversary (and hence can't be snooped/intercepted).

In embodiments, to address the underlying vulnerabilities that allow phishing to be conducted with passwordless solutions, two specific problems must be solved. To prevent signing fool scenarios, origin information must be available. The origin information must be trustworthy and resistant to spoofing. To prevent information disclosure, the system must form assurances that the party that opened the connection to the rendezvous channel for any specific authentication attempt originates from the same device that processes the login-establishing device binding for the communications channel.

Property Comparison

To compare the mechanisms described in the previous sections, the following terms are defined. These terms describe the set of desirable properties for a phish-resistant, universal mechanism that the solution presented in this document addresses.

Ubiquitous: The mechanism is user agent and operating system agnostic. It is available in all circumstances, regardless of the combination of operating system and user agent.

Device Bound: Clients connecting to a communication channel can be uniquely associated with a single specific device.

Validates Origin: The mechanism can identify whether the source of a request is legitimate or not and refuses to operate on illegitimate requests.

Supports 3rd party platform authenticators: The mechanism can feasibly and reliably be implemented into a product from an independent software vendor.

In a deployment scenario where legacy and unsupported user agents must be supported, a mechanism that satisfies the ubiquitous property must be chosen, leading to residual risk if that mechanism is also not phish-resistant. Stringent authentication policies should limit communication mechanisms to only those that provide the highest assurance level possible without leaving weak points that can be exploited by an adversary. The presence of an incompatible application and the requirement to support authentication begats the need to use fallback mechanisms that fail to provide the same security guarantees as phish resistant methods do.

Fundamental Requirements

A suitable candidate for communicating authentication grants to a user agent over a rendezvous channel should fulfill all the aforementioned desirable properties. The mechanism presented in this paper does just this and relies on the ability to inject and observe state present in network traffic in a manner that requires no changes to existing protocols. The mechanism also does not rely on operating system or user agent specific features, but instead on widely used and standardized internet protocols. The fundamental requirements of the protocol are discussed in depth in this section.

Packet Capture

Fundamental to the design of the mechanism is the capacity to perform packet capture and analysis on the end user device. Fortunately, packet capturing mechanisms are well supported on all major operating systems.

Apple® MacOS® & iOS®

MacOS and iOS support the creation and installation of custom Content Filter Providers as extensions to the operating system which allow packet capture.

Microsoft Windows®

Microsoft Windows is supported by open-source solutions such as WinPcap and Npcap. Windows, like MacOS, also supports OS extensions in the form of Windows Filtering Platform APIs.

Linux

Linux is supported by Libpcap and does not feature a comparable extension framework akin to the Windows or MacOS options.

Google Android

Android also does not feature an explicit packet-capturing facility. However, packet capture may be implemented using a VPNService without the use of a VPN server. PCAPDroid, an open-source Android app, uses VPNService to provide packet capturing, firewall, and network monitoring capabilities to non-rooted devices.

Server Name Indication

A precondition of support for the mechanism presented in this document is that the operating system and user agent in use support the Server Name Indication (SNI) extension. SNI originated in IETF RFC 3546 Transport Layer Security (TLS) Extensions and was intended to support a situation in which there are multiple virtual servers sharing the same network address as the server, as the server needs to supply the correct certificate for the requested hostname. The key property of SNI used in this protocol is that the field includes the " . . . fully qualified DNS hostname of the server". This is essential for the protocol being proposed, as the protocol encodes unique information into the URL via a subdomain (further referred to as the connection nonce), which is relayed in plaintext. Furthermore, TLS may pass the SNI value on to the application as opaque data. IETF RFC 6066, the most recent version of the standard that deprecates RFC 3546, also requires that the ability to resume a session be predicated on the value of the SNI extension matching the value used to establish the session (if supplied). This further ensures that a new connection to a unique subdomain triggers a full TLS handshake as a previous connection to a different subdomain cannot be reused.

As the proposed protocol requires the SNI value to extract the connection nonce, the protocol must fail closed in situations where SNI is not included as no connection nonce can be detected on the client side. Per the open-source data aggregator Can I Use, SNI has been well supported in all major browsers since 2011.

Transport Layer Security (TLS) Versions

TLS 1.3 is the most current and supported version of TLS in use today, with TLS 1.0 and 1.1 being officially deprecated in IETF RFC 8996, and TLS 1.2 being made the minimum recommended version to use. Under this guidance, the protocol presented in this document is intended to support only TLS 1.2 and 1.3. Both versions (1.2 and 1.3) support the SNI extension.

TLS ClientHello Detection

Packet capture is used to detect and capture the SNI value present in a ClientHello message on the client side of the handshake. The decision to use packet capture was made due to the ubiquity of packet capturing mechanisms on all major operating systems, as well as being a safe, low-risk mechanism to implement.

To be most effective in all expected deployment scenarios, the client side SNI detection must be able to detect ClientHello packets for both IPv4 and IPv6 network protocols as well as within TLS 1.2 and 1.3 structured handshake protocols. An appropriately scoped Berkley Packet Filter (BPF) must be implemented to filter packet capture to only traffic that qualifies for both privacy and efficiency purposes. Care must be taken in the design of the filter as the packet structure differs between TLS versions.

In TLS 1.2, the ClientHello client_version field is set to 0x0303 (TLS 1.2), although may set an earlier version if the client wishes to use an older version of SSL/TLS [20]. TLS 1.3 also sets the ClientHello client_version (renamed to legacy_version) field to 0x0303 (TLS 1.2) to deal with observed problems in version negotiation, but also supplies the 0x0304 (TLS 1.3) version code in the supported_versions extension.

Identification of a ClientHello packets should therefore inspect the following properties:

Client version field equal to 0x0303 (TLS 1.2 and 1.3).

Content type field set to 0x16 (Handshake).

Handshake type field set to 0x1 (ClientHello).

An appropriate BPF filter implementing ClientHello detection for these requirements is as follows:

$$(tcp[tcp[12]/16*4] = 22 \text{ and } (tcp[tcp[12]/16*4+5] = 1) \text{ and } (tcp[tcp[12]/16*4+9] = 3) \text{ and } (tcp[tcp[12]/16*4+1] = 3)) \text{ or } (ip6[(ip6[52]/16*4)+40] = 22 \text{ and } (ip6[(ip6[52]/16*4+5)+40] = 1) \text{ and } (ip6[(ip6[52]/16*4+9)+40] = 3) \text{ and } (ip6[(ip6[52]/16*4+1)+40] = 3))$$

This filter uses two main clauses separated by a logical OR: the first to support IPv4, and the second to support IPv6.

In both cases, 22 is used to check the TLS record layer content type is equal to the expected value, indicating it is a handshake packet, and 1 is used to check it is a ClientHello Handshake type. Both primary clauses also check that the value of the client version field is equal to 0x0303.

To provide additional guarantees regarding efficiency and privacy, the BPF filter could be extended to look at only specific IP addresses. This assumes a static IP address or mechanism to keep the IP address list of the server updated.

Server Name Indication (SNI) Detection

Once the protocol has identified a packet matches the requirements, the SNI value must be extracted. The location of the SNI extension structure is dependent on the version of TLS in use as the structure of the overall TLS message is different. The structure of the SNI extension is the same regardless of TLS version in use. Once the SNI extension has been located, the value of the server name can be extracted, and the value of the connection nonce detached.

TLS ServerHello Detection

To ensure that a connection was accepted by the cloud service prior to signing any proof-of-possession challenges, it is necessary to observe and correlate the corresponding ServerHello that is issued by the server in response to the ClientHello that the client sends to initiate the connection. The ServerHello message does not contain the SNI property, so it cannot be used to identify the message in relation to the unique connection nonce value used in the URL. However, the TLS session ID can be used as it must match the session ID of the ClientHello.

Once a ClientHello has been detected, identification of the corresponding ServerHello requires inspection of all ServerHello packets. This could also realistically be limited to inspecting only packets from an expected set of remote IP addresses or to only packets that contain the expected TLS Session ID in order to limit deep packet inspection requirements. An appropriate BPF filter implementing ServerHello detection for these requirements is as follows:

$$(tcp[tcp[12]/16*4] = 22 \text{ and } (tcp[tcp[12]/16*4+5] = 2) \text{ and } (tcp[tcp[12]/16*4+9] = 3) \text{ and } (tcp[tcp[12]/16*4+1] = 3)) \text{ or } (ip6[(ip6[52]/16*4)+40] = 22 \text{ and } (ip6[(ip6[52]/16*4+5)+40] = 2) \text{ and } (ip6[(ip6[52]/16*4+9)+40] = 3) \text{ and } (ip6[(ip6[52]/16*4+1)+40] = 3))$$

This filter is essentially the same as the previous, differing only by the Handshake type value as ServerHello messages are indicated the value 2. A unified filter can be constructed to simplify collection.

$$(tcp[tcp[12]/16*4] = 22 \text{ and } (tcp[tcp[12]/16*4+5] = 1) \text{ or } tcp[tcp[12]/16*4+5] = 2) \text{ and } (tcp[tcp[12]/16*4+9] = 3) \text{ and } (tcp[tcp[12]/16*4+1] = 3)) \text{ or } (ip6[(ip6[52]/16*4)+40] = 22 \text{ and } (ip6[(ip6[52]/16*4+5)+40] = 1 \text{ or } ip6[(ip6[52]/16*4+5)+40] = 2) \text{ and } (ip6[(ip6[52]/16*4+9)+40] = 3) \text{ and } (ip6[(ip6[52]/16*4+1)+40] = 3))$$

Encrypted Client Hello (ECH)

Originally proposed as Encrypted Server Name Indication for TLS 1.3 (ESNI) and now known as TLS Encrypted Client Hello [24], a draft IETF RFC proposes a mechanism to encrypt the full TLS ClientHello message using Hybrid Public Key Encryption (HPKE) where the server distributes a public key through a DNS TXT record obtained using DNS over HTTPS (DoH). This poses a problem as the SNI extension in situations where ECH is deployed will be unreadable. In its current form, ECH is opt-in as it requires additional configuration on the server-side to support it. In situations where ECH is a requirement, the protocol must be extended to differentially handle ECH decryption.

As ECH encrypts the entire ClientHello message, client-side detection and capture of the plaintext SNI header (and by extension the connection nonce) when ECH is used required decryption of the entire ClientHello message. This violates the guarantee of confidentiality provided by ECH as the decryption key must be provided to client-side software, rendering the confidentiality provided by ECH inert due to key exposure and intentional decryption. For this reason, it is to be considered only in cases where ECH must be deployed.

Encrypted Server Certificates

TLS 1.3 moved the server certificate exchange mechanism from a single, distinct message (as in TLS 1.2 [25]) into a consolidated, encrypted message. This means that the server certificate is not able to be captured in plaintext by packet capture, limiting the ability for the protocol to do server certificate validation on the connection. This is unfortunate as server certificate validation would abate concerns regarding adversary-in-the-middle style proxy attacks.

Protocol Description

The protocol is designed to be supported by two distinct servers, one acting as the coordinator, and one acting as the gateway. The coordinator is responsible for generating the connection nonce, embedding it in a URL, and issuing it as a HTTP redirect in response to client requests. It is also responsible for receiving client attested connection nonce responses. The gateway is responsible for mediating the TLS handshake. These are two distinct services as it simplifies changes to the TLS stack. As HTTP routing happens after the TLS channel has been established, the service mediating the handshake cannot also be the one issuing the redirect as the redirect will never be issued due to the handshake not completing.

Figure 3:
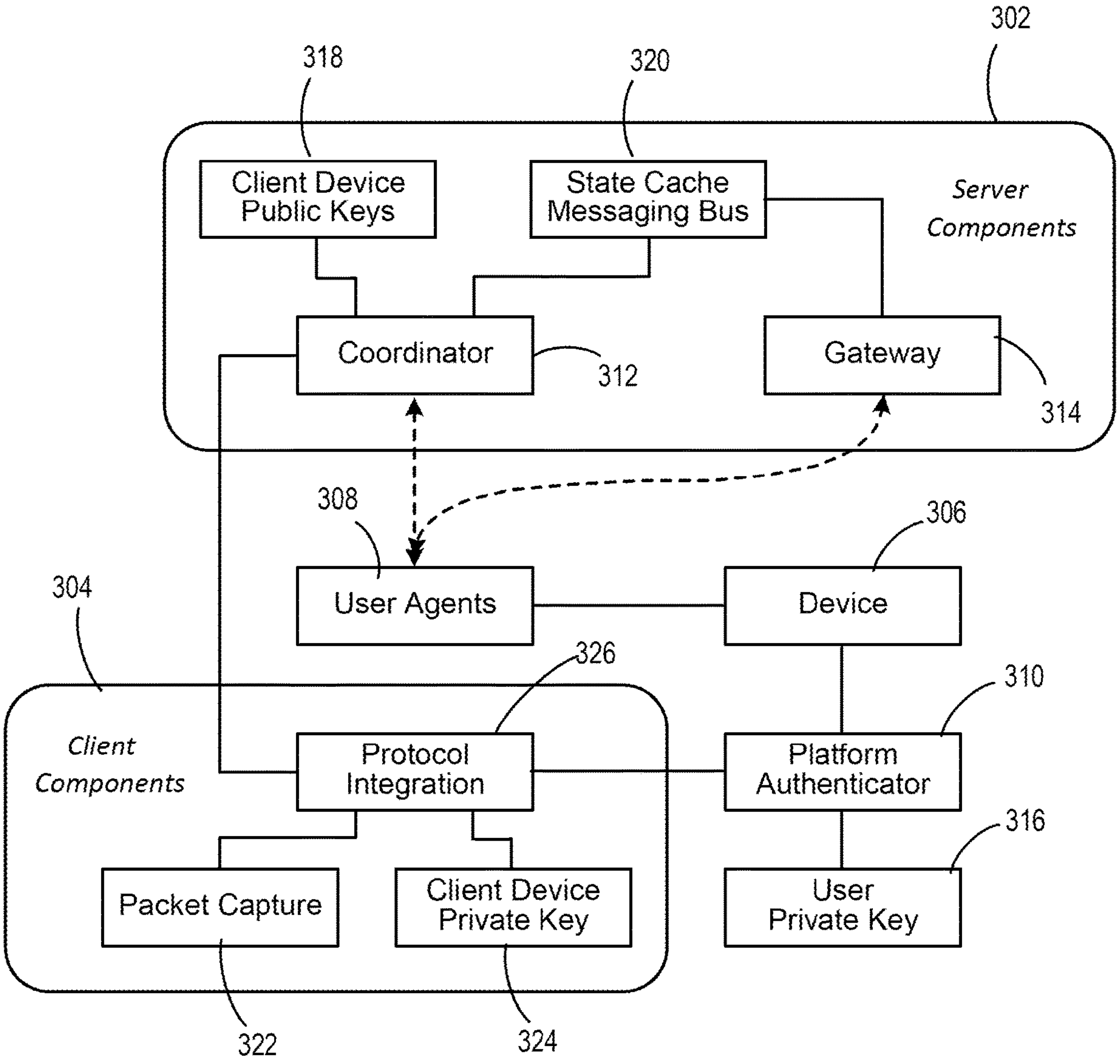
FIG. 3 is a diagram illustrating server and user device components used to implement an authenticator protocol, according to embodiments.

FIG. 3 is a diagram illustrating server and user device components used to implement an authenticator protocol, according to embodiments. Certain components are grouped as client components 304 on the user device, and others as server components 302. Also illustrated are the user device 306, user agents 308, platform authenticator 310 and user private key 316. The server components include a coordinator 312 and a gateway 314. In one embodiment, coordinator 312 and a gateway 314 are on separate servers. Also shown are the storage of the client public keys 318 and a state cache messaging bus 320. The messaging bus communicates between the coordinator and the gateway. Because the user agent is connecting to the gateway as part of the redirect, it doesn't have a way to be notified when the platform authenticator attests to the connection on the coordinator, so it has to be notified somehow. A message bus is a reliable and efficient way to do this. The client components include a packet capture module 322, the client device private key 324 and a protocol integration module 326. This is the component that uses packet capture to detect the SNI condition, uses the device private key to sign the SNI value, and sends the attestation to the coordinator.

There must also exist a user key and a device key. The device key should be bound to hardware with a TEE but have no usage restrictions and can be used silently by the application providing the client-side implementation of the protocol. The user key should be protected with user intent restrictions, such as biometrics or PIN. Implementation details of the user key is out of scope of this protocol and is central to the passwordless authentication protocol. There must also exist a component running on the authenticating device that manages client-side packet capture and reporting to the cloud.

Protocol Description—Channel Establishment

Figure 4A:
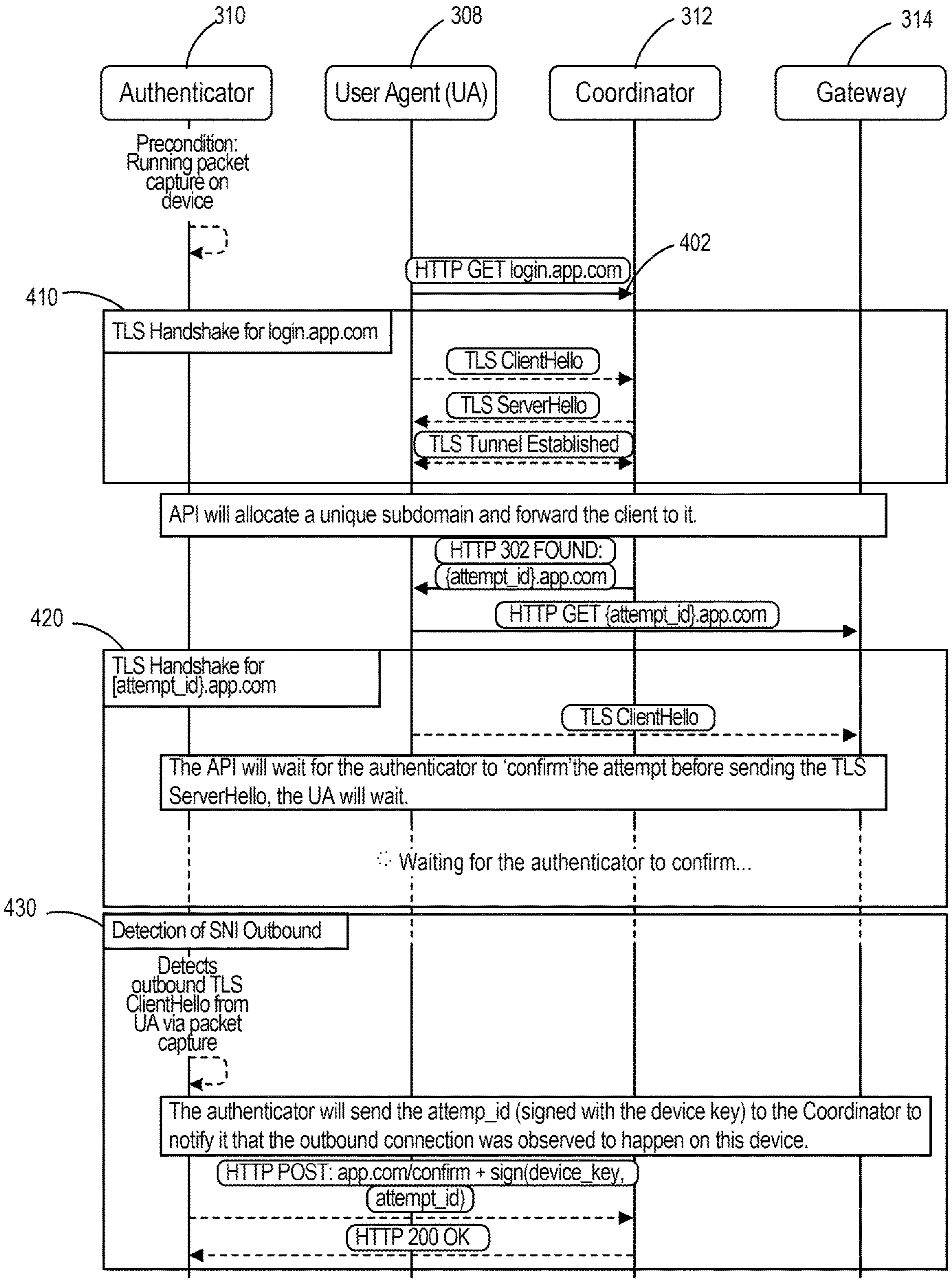
FIGS. 4A-B are an authenticator protocol sequence diagram, according to embodiments.
Figure 4B:
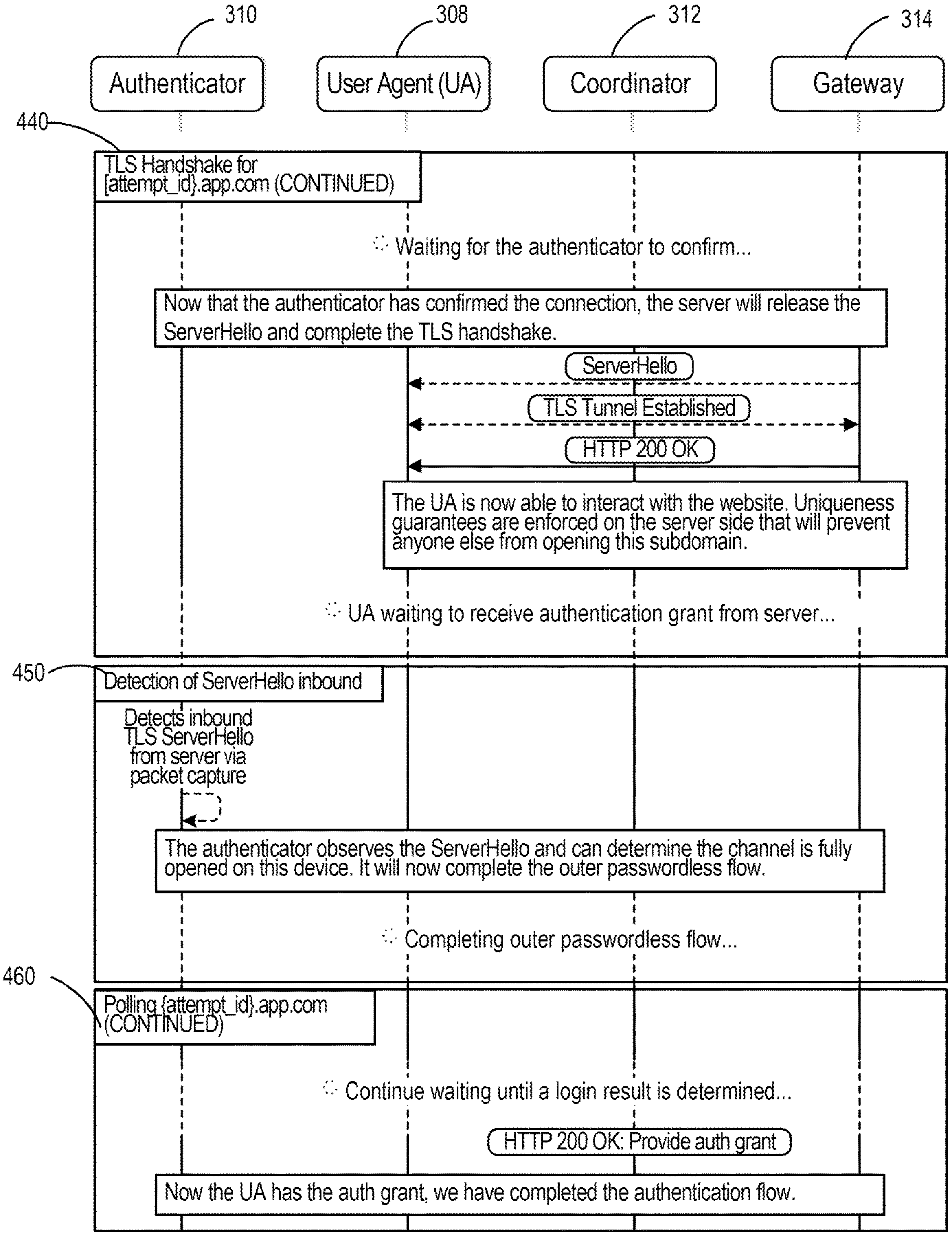

FIGS. 4A-B are an authenticator protocol sequence diagram, according to embodiments. This sequence diagram illustrates the steps taken by the components of FIG. 3 to establish a phishing-resistant rendezvous channel. Shown are the communications between authenticator 310, user agent 308, coordinator 312 and gateway 314.

A user agent 308 is downloaded to a client device, or an existing user agent is updated to send cloud service connection attempts to coordinator 312. When a user agent attempts to initiate a connection to the cloud service (402), the coordinator issues a redirect (410) to a unique subdomain at a domain delegated to function as the protocol's main entry point and hosted by the gateway. The unique subdomain contains the value of the connection nonce. This will trigger a TLS ClientHello (420) to be sent from the client device to the gateway server. A wildcard DNS entry allows the subdomain to be generated on the fly.

The application responsible for the client side of the protocol (protocol integration module 326, as part of authenticator 310) detects this outbound ClientHello packet, extracts the value of the SNI extension (i.e., the connection nonce), bundles it with a timestamp, signs the bundle using the device private key, and reports it to the coordinator via API call (430). The client application also extracts and caches the TLS session ID to compare against later. While this is happening, the TLS connection opened by the user agent to the gateway will be 'paused' waiting for the gateway to send the ServerHello in response to the coordinator approving the attested response. On receipt of confirmation from the coordinator, the gateway will send the ServerHello and complete the handshake (440) with the user agent. The server will restrict the subdomain to only ever supporting connection by one client by holding the state of the transaction in memory-any other connection attempts against the subdomain will be rejected. The client application (authenticator 310) must detect (450) the ServerHello issued by the gateway and correlate the TLS session ID to the original ClientHello. When the client application has observed both a ClientHello and a ServerHello with matching TLS session IDs, it can determine that the connection to the gateway has completed, and it holds the only connection to that domain. This completes the protocol as proposed but does not complete the implementation in regard to the wider passwordless system.

Because of the fundamental problem of not being able to communicate bidirectionally (or in some cases, at all) between the user agent on the platform authenticator (i.e the platform authenticator can't establish origin information from the user agent needed for phish resistance), there needs to be some way of passing authentication grants back to the user agent in a way that doesn't require bi-directional communication between the platform authenticator on the user agent, but still has security guarantees against snooping or phishing. By doing packet capture and attesting that a specific device is opening the unique channel, we end up with a uni-directional 'rendezvous' channel that is resistant to snooping (unlike existing implementations) because of the guarantees that there will only ever be one client that can open it, and it's on this device. Once there is the server hello, and the TLS tunnel be established, the platform authenticator is the entity that is continuing the authentication. Thus, the platform authenticator does not release information that may be snooped on. Therefore, if it can validate that the channel is secure, it can have trust that's the party on the other side is the resident on the same device.

Protocol Description—Platform Authenticator Integration

As a generalization, the passwordless system implementing the protocol will receive a nonce to sign to prove possession of a user private key. Delivery of this nonce is out of scope to the protocol described in this document, however, the nonce should be delivered in a manner that binds the unique URL to the request. This may include signing both the challenge nonce and the value of the subdomain with a server private key. It also may be returned as a response to the API call made by the client software when communicating the signed subdomain nonce to the server.

The platform authenticator must verify that the TLS tunnel was opened successfully on the same device (i.e., a ServerHello was found using the same TLS session ID, signaling the server accepted the signed response) before signing the challenge nonce with the user key and responding to the server. The server then validates the response using the public key of the user and issues credentials and/or an OAuth redirect to the user agent (460) over the TLS connection provisioned to the user agent during the protocol described earlier.

Connection Finite State Model

Figure 5:
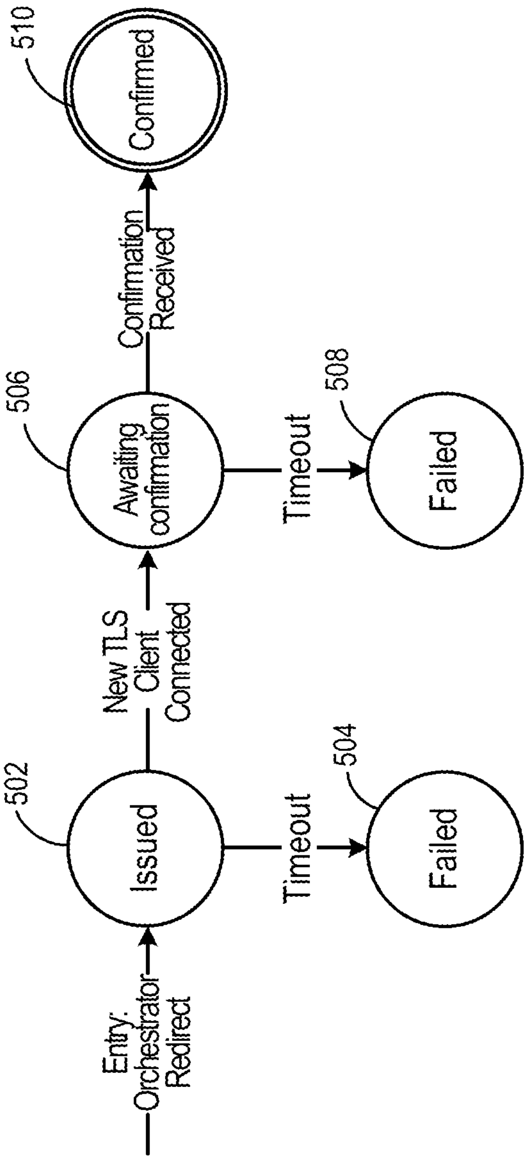
FIG. 5 is a finite state model of connection status for an authenticator protocol, according to embodiments.

FIG. 5 is a finite state model of connection status for an authenticator protocol, according to embodiments.

To provide uniqueness guarantees regarding the nonce issued in the subdomain, the state of the transaction must be tracked on the server side. Connection nonces are issued in the form of a random string, formatted as a subdomain prepended to the root domain of the gateway server. On receiving a new connection, the coordinator generates a new random string and stores it in a temporary data store, such as a list in memory when running as a single node or a cache such as Redis. The nonce is 'Issued' and the coordinator will not issue the same nonce within the time allocated to the attempt. In the unlikely event that the coordinator generates a conflicting connection nonce, it will discard the conflicting nonce (leaving the existing attempt alone) and generate a new one.

Once a connection nonce enters the 'Issued' state 502, a timer is started. Each nonce is valid for only a limited time to prevent enumeration attacks. If the timeout is reached before a client connects, it enters a failed state 504 and the nonce is returned to the pool of values through deletion of the tracking record.

Due to the redirect issued by the coordinator, a new client is expected to connect to the gateway. This client manifests as a new TLS client and is detected on the server side through inspection of the SNI value in the subsequent ClientHello packet. When a new client presents a ClientHello with the issued nonce, the nonce enters an 'Awaiting Confirmation' state 506. The server does not respond to the connecting client at the TLS layer until it enters the 'Confirmed' state 510. Timeout of the timer in this state also results in a failed attempt 508, returning a handshake_failure response to the client, a fatal TLS error that terminates the connection.

If a second client connects while the state machine is in this state, the new connection is denied. This is achieved by returning a handshake_failure TLS error response to the client. This property prevents other clients from attempting to open the connection and secures the TLS tunnel by enforcing a single use policy.

If the server receives a valid confirmation of the connection via an API call from the client containing a signed connection nonce, the state machine enters the 'Confirmed' state. Upon confirmation, the gateway server returns the ServerHello, the TLS channel is established, and the connecting client is able to interact with the cloud service.

Threat Models

The following threat models identify common phishing scenarios and vulnerabilities in existing passwordless solutions. Threats defined for this protocol assumes that attacks are executed in a network attack scenario. The protocol provides no protection against scripts executed on the victim computer outside of the context of a well-formed user agent. Furthermore, it makes no attempt to enumerate all threats against the outer authentication protocol (i.e., OAuth).

Snooping on the Rendezvous Channel

Description: A malicious actor correctly guesses or captures the nonce value used in the subdomain and uses it to attempt to gain access to the channel used to pass authentication credentials (such as cookies and/or OAuth redirection URLs) back to the user agent in order to capture sensitive data.

Response: Access to the channel is one-time use and is enforced through limitations on the TLS channel. Access to an existing nonce subdomain by a malicious actor, even if they identify a valid nonce, will be denied due to enforcement of this property. The platform authenticator will also not sign a challenge response without first establishing the TLS channel was opened on the same device, avoiding situations in which a third party opens the channel.

Adversary in the Middle (AitM) Proxy Attack

Description: An adversary uses a proxy to place themselves within the authentication path to capture credentials as they pass between client and server.

Response: The SNI detection mechanism activates only on predefined server names. The protocol relies on the integrity of TLS & CA infrastructure to ensure that only authorized services may present a certificate for the predefined domain.

Packet capture may be restricted to predefined IP addresses, preventing adversary-in-the-middle proxy attacks from untrusted IP addresses.

Malicious Script Triggers Flow

Description: A script embedded in a malicious site dispatches a request to the coordinator, beginning a login process.

Response: Cross Origin Resource Sharing (CORS) policies prevent the victim's user agent from interacting with the cloud services from domains other than those configured. This prevents the ability for malicious scripts to connect to the channel on which authentication grants are dispatched.

Replay of Captured Signed Nonce

Description: An adversary captures and replays a signed nonce being transmitted from the client to the server.

Response: Allocation of the nonce is controlled by the coordinator. For a client to open a connection to a subdomain, the coordinator must have previously allocated it. Uniqueness guarantees on the nonce used as the subdomain and the number of clients connecting to it during the lifetime of the attempt are strictly enforced to prevent collisions and replay.

The signed nonce also includes a timestamp. The signed message is no longer to be considered valid after a delta of timestamp+lifetime (i.e., 2 minutes), protecting against replay in the unlikely event of being allocated the same nonce in future.

Triggering Victim Device into Asserting Ownership of Connection

Description: An adversary opens a connection to the service, giving them a pending TLS connection. The adversary then tricks the victim into opening the same connection to have the victim's device confirm the connection, releasing the adversary's pending connection under the context of the victim.

Response: As the server rejects additional connections, the passwordless authenticator using the protocol must ensure that the connection was observed to complete successfully on the device prior to releasing a signed proof-of-possession to the server. This takes the form of additional traffic capture, specifically observing the completion of the TLS handshake on the channel.

In a complete system, the server must also be able to correlate the key used to sign the nonce as part of opening the communications channel in this protocol with the key used to sign the proof-of-possession authentication response and have an attestation statement from the TEE that the keys are stored securely in hardware. This further ensures that the device signing the authentication response and the device receiving the authentication grants from the server are the same.

Implementation

The protocol was developed and implemented in Go on an Apple 16-inch MacBook Pro 2019 running MacOS Ventura. Server-side state management and messaging was achieved using Redis. Packet capturing and decoding facilities on the client side were attained using the open-source gopacket library. A second open-source package, pault.ag/go/sniff, was used to simplify SNI value extraction. The asynchronous waiting mechanism that controls the completion of the TLS handshake was implemented using channels, a Go concurrency and synchronization primitive. A CA and TLS certificates were generated manually and added to the device's trust store. Although not integrated into a wider passwordless solution, the protocol was designed to produce a Boolean result to reflect the condition in which the TLS channel had been established so that a platform authenticator may wait for such a condition.

Security Testing

As a part of evaluation of the protocol, the author undertook security testing to find and eliminate vulnerabilities. Security testing adopted the Open Web Application Security Project (OWASP) Top 10 2021 and focused specifically on known vulnerabilities presented in the threat model section of this document. Security testing was directed at the implementation described in the Implementation section of this document.

Findings

Testing revealed a flaw that allowed a remote attacker to trick a victim's system into unintentionally attesting that a channel was opened on their device by linking their user agent to the domain. This vulnerability led to the implementation of the ServerHello detection mechanism. By predicating signing of the passwordless proof-of-possession challenge on detection of a ServerHello, the passwordless application ensures that not only was the channel opened on the device, it was also opened completely and that the server allowed the connection. This is an important distinction to make as a ClientHello is sent prior to the establishment of a TLS session, so no observations regarding the state of the connection can be made on the client side. As the server will either respond with a ServerHello, indicating that the server accepted the connection and the device owns the TLS session, or the server will respond with a TLS error, terminating the attempt. This finding was discovered whilst evaluating threat model item 'E. Triggering victim device into asserting ownership of connection'. More information can be found in the Threat Model section of this paper. No other significant security vulnerabilities were identified during testing.

Performance

To validate the efficacy of the approach, performance testing was used to determine how reliable the implementation of the protocol is. Performance testing was undertaken against the Go implementation using a single node configuration. Performance testing results are presented in milliseconds and account for a fully attested flow for the user agent, not the client software.

For the user agent to have completed a full flow, the system must complete the following (including two full HTTP request/responses):

Access coordinator, be allocated and redirected to a subdomain.

Follow redirection, detect outgoing TLS ClientHello.

Extract, sign, and submit response to coordinator.

Receive response from server.

Local performance testing was undertaken with a single client binary, a single coordinator server, and a single gateway server. The open-source load testing application Apache JMeter was used for scheduling and executing requests. The tests were performed on a six-core MacBook Pro 2019 with 64 gb 2667 MHZ DDR4 memory. The tests were executed with different thread counts to simulate numbers of simultaneous users. Each test was executed as a continuous load test over a period of 5 minutes. Performance testing revealed the implementation of the protocol handled large, sustained request loads and scaled linearly.

Figure 6B:
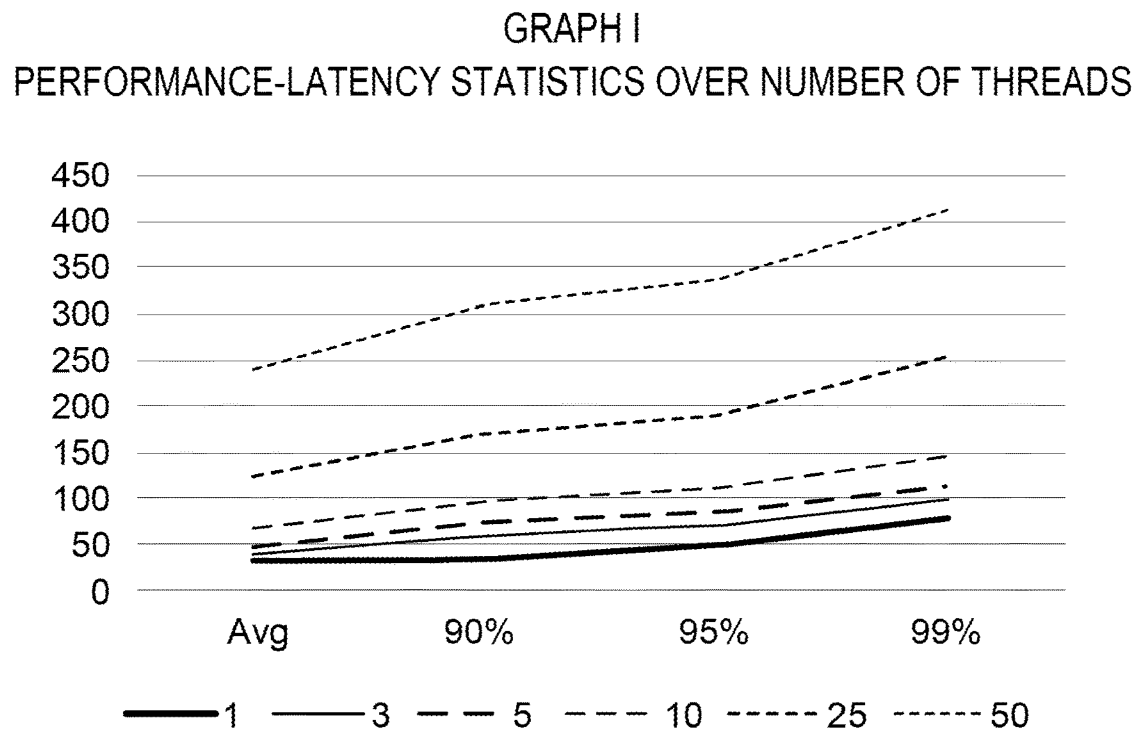
Figure 6C:
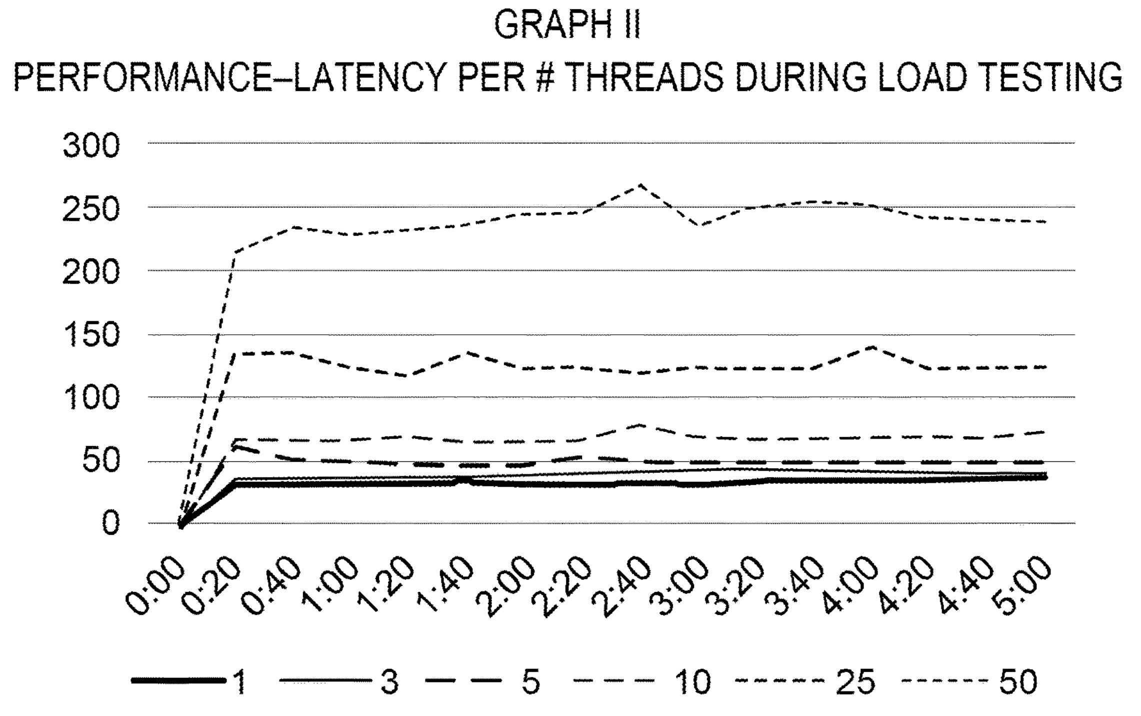

FIGS. 6A-C are performance tables and graphs illustrating experimental results of an authenticator protocol, according to embodiments.

Computer Systems for Media Platform and Client System

Figure 7:
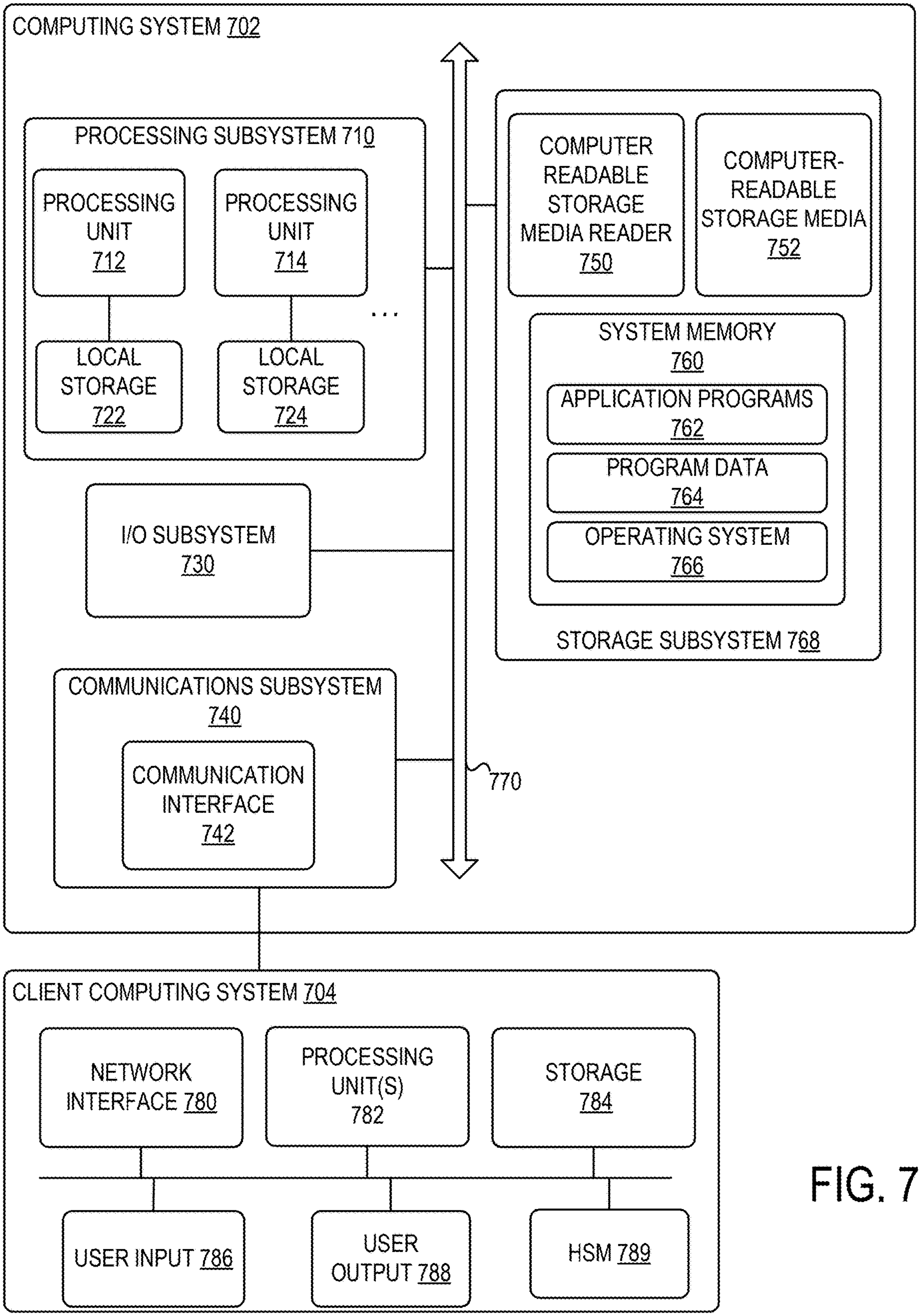
FIG. 7 is a simplified block diagram of a representative computing system and client computing system usable to implement certain embodiments of the present invention.

Various operations described herein may be implemented on computer systems. FIG. 7 shows a simplified block diagram of a representative computing system 702 and client computing system 704 usable to implement certain embodiments of the present invention. In various embodiments, computing system 702 or similar systems may implement the server or website computing system or other verifying party, or any other computing system described herein or portions thereof. Client computing system 704 or similar systems may implement user devices such as a smartphone, tablet, computer, smart watch, or other devices.

Computing system 702 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770. These peripheral systems may include I/O subsystem 730, storage subsystem 768, and communications subsystem 740.

Bus subsystem 770 provides a mechanism for letting the various components and subsystems of server computing system 704 communicate with each other as intended. Although bus subsystem 770 is shown schematically as a single bus, alternative embodiments of the bus subsystem may utilize multiple buses. Bus subsystem 770 may form a local area network that supports communication in processing subsystem 710 and other components of server computing system 702. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or nonvolatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read and write memory device or a volatile read and write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a nonvolatile read and write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of UPP system 102, or any other server(s) associated with UPP system 102. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in read-only memory and/or program code stored in nonvolatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or nonlocal storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present invention.

Storage subsystem 768 may include one or more non-transitory memory devices, including volatile and non-volatile memory devices. As shown in FIG. 7, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network attached storage, and the like may be used. Any data stores or other collections of data described herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., WiFi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user owned or user operated devices via a wide area network such as the Internet. An example of a user operated device is shown in FIG. 7 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 also includes a Hardware Security Module (HSM) 789. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high powered computing device. Client computing system 704 may be provisioned with program code executable by processing unit(s) 782 to enable various interactions with computing system 702 of a message management service such as accessing messages, performing actions on messages, and other interactions described above. Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as WiFi, Bluetooth®, or cellular data network standards (e.g., 3G, 4G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light emitting diode (LED) including organic light emitting diodes (OLED), projection system, cathode ray tube (CRT), or the like, together with supporting electronics (e.g., digital to analog or analog to digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher level code that are executed by a computer, an electronic component, or a microprocessor using an interpreter. Through suitable programming, processing unit(s) 712, 714 and 782 may provide various functionality for computing system 702 and client computing system 704, including any of the functionality described herein as being performed by a server or client, or other functionality associated with message management services.

It will be appreciated that computing system 702 and client computing system 704 are illustrative and that variations and modifications are possible. Computer systems used in connection with embodiments of the present invention may have other capabilities not specifically described here. Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

While the invention has been described with respect to specific embodiments, one skilled in the art will recognize that numerous modifications are possible. Embodiments of the invention may be realized using a variety of computer systems and communication technologies including but not limited to specific examples described herein.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer readable storage medium).

Thus, although the invention has been described with respect to specific embodiments, it will be appreciated that the invention is intended to cover all modifications and equivalents within the scope of the following claims.

What is claimed is:

1. A method to be implemented by a coordinator server, the method comprising:

receiving, from a user agent of a device, a signal to initiate a connection between the user agent and a cloud service;

establishing a transport layer security (TLS) tunnel with the user agent;

allocating, to the connection, a unique subdomain of a domain hosted by a gateway server;

providing, to the user agent, a redirect to the unique subdomain;

receiving, from an authenticator of the device, validation that the user agent initiated a connection directed to the unique subdomain; and sending an instruction to the gateway server to permit establishment of a second TLS tunnel between the user agent and the gateway server.

2. The method of claim 1, wherein the unique subdomain includes a value of a connection nonce.

3. The method of claim 2, wherein the connection nonce is an SNI extension.

4. The method of claim 1, further comprising:

transmitting, to the authenticator, a confirmation of the validation that the user agent initiated a connection directed to the unique subdomain.

5. At least one non-transitory computer-readable medium comprising instructions that, when executed by at least one processor, perform a method comprising:

receiving, from a user agent of a device, a signal to initiate a connection between the user agent and a cloud service;

establishing a transport layer security (TLS) tunnel with the user agent;

allocating, to the connection between the user agent and a cloud service, a unique subdomain of a domain hosted by a gateway server;

providing, to the user agent, a redirect to the unique subdomain;

receiving, from an authenticator of the device, validation that the user agent initiated a connection directed to the unique subdomain; and sending an instruction to the gateway server to permit establishment of a second TLS tunnel between the user agent the gateway server.

6. A method comprising:

establishing a transport layer security (TLS) tunnel with a user agent in response to receiving a request from the user agent to connect to a cloud service;

generating a subdomain of a domain hosted by a gateway, the subdomain being associated with the request from the user agent; and sending a redirect to the user agent to connect to the subdomain.

7. The method of claim 6, further comprising establishing a TLS tunnel between the user agent and the subdomain of the domain hosted by the gateway.

8. The method of claim 6, further comprising, subsequent to sending the redirect to the user agent to connect to the subdomain, relaying authentication data between the user agent and the cloud service.

9. The method of claim 6, wherein the subdomain includes a value of a connection nonce.

10. The method of claim 9, wherein the connection nonce is provided in a server name indication (SNI) extension.

11. The method of claim 7, further comprising receiving, from an authenticator of a device of the user agent, a notification that a message associated with the TLS tunnel between the user agent and the subdomain of the domain hosted by the gateway was detected at the device.

12. The method of claim 11, further comprising transmitting, to the authenticator, a confirmation of the notification.

13. The method of claim 6, wherein the redirect comprises an HTTP redirect that embeds the subdomain in a URL.

14. The method of claim 6, wherein a coordinator service that establishes the TLS tunnel and the gateway are hosted by separate servers.

15. The method of claim 6, wherein sending the redirect triggers the user agent to establish a second TLS tunnel with the gateway.

16. The method of claim 1, wherein the redirect to the unique subdomain comprises an HTTP redirect that embeds the unique subdomain in a URL.

17. The method of claim 1, wherein the coordinator server and the gateway server are hosted by separate servers.

18. The method of claim 1, further comprising, subsequent to sending the instruction to the gateway server, relaying authentication data between the user agent and the cloud service.

* * * * *